UNITED STATES PATENT OFFICE.

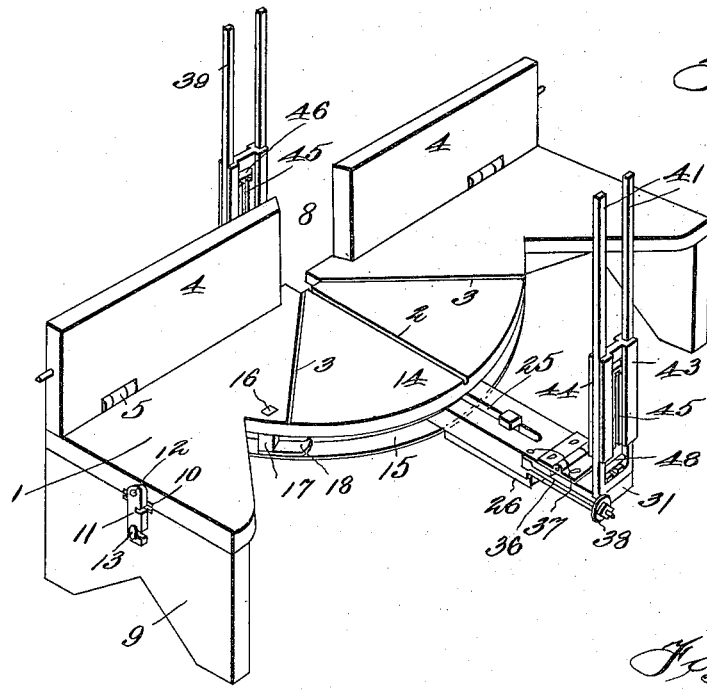

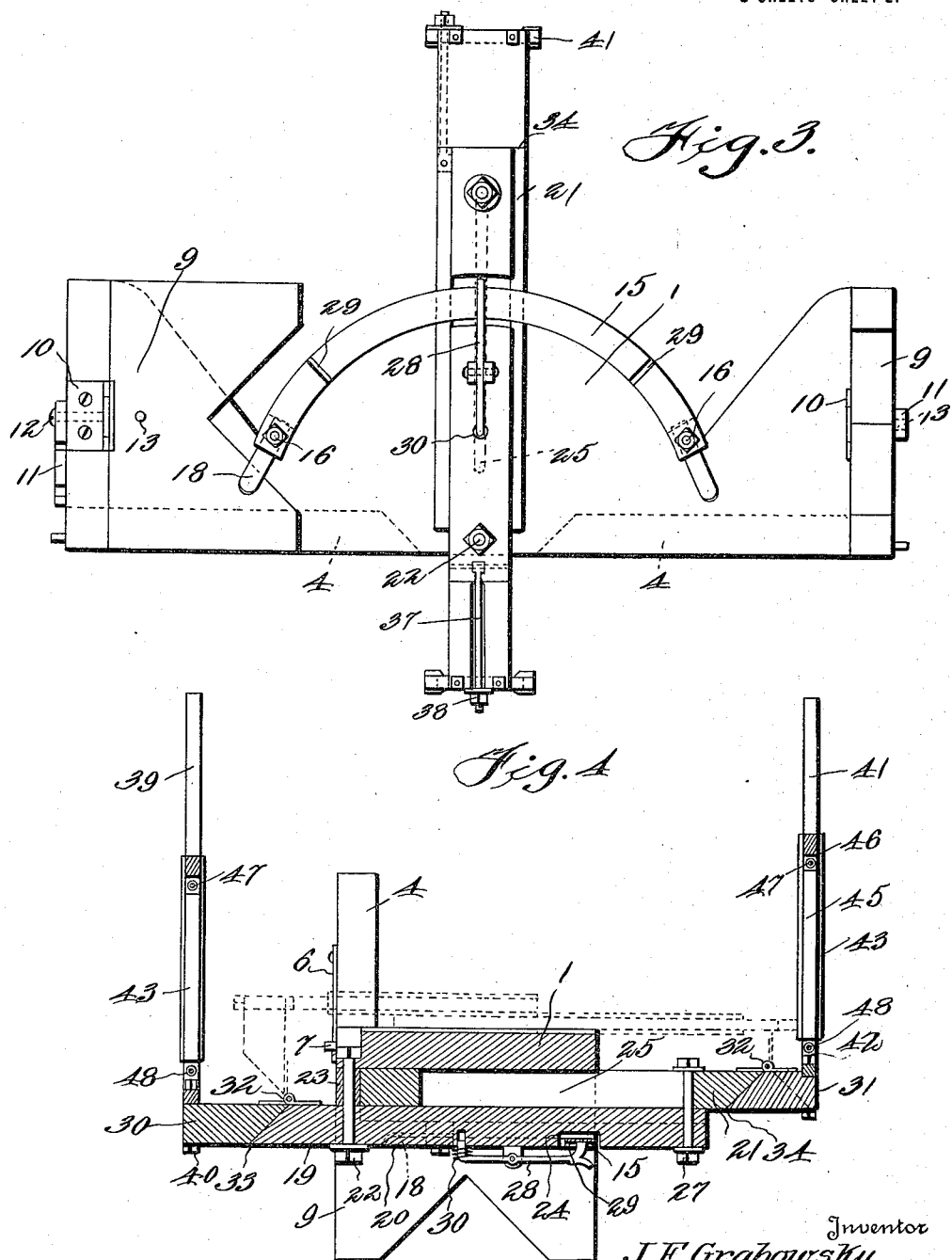

JOHN F. GRABOWSKY, OF BROKAW, WISCONSIN.

FOLDING MITER-BOX.

1,155,912.  Specification of Letters Patent.  Patented Oct. 5, 1915.

Application filed May 28, 1915. Serial No. 30,971.

*To all whom it may concern:*

Be it known that I, JOHN F. GRABOWSKY, a citizen of the United States, residing at Brokaw, in the county of Marathon and State of Wisconsin, have invented certain new and useful Improvements in Folding Miter-Boxes; and I do hereby declare the following to be a full, clear, and exact description of the invention, such as will enable others skilled in the art to which it appertains to make and use the same.

This invention is an improved folding miter box, the object of the invention being to provide a miter box of improved construction which may be compactly folded so as to occupy but little space when not in use, and which also embodies a foldable and longitudinally adjustable arm which carries the saw guides and which may be set at any desired angle with respect to the miter box.

The invention consists in the construction, combination and arrangement of devices hereinafter described and claimed.

In the accompanying drawings:—Figure 1 is a perspective view of a folding miter box constructed in accordance with my invention, showing the same set up ready for use. Fig. 2 is a similar view of the same, folded. Fig. 3 is an inverted plan of the same. Fig. 4 is a vertical transverse sectional view of the same.

The bottom 1 of my improved miter box is provided on its upper side with a right angled saw kerf 2 at the center, and with saw kerfs 3 which are arranged on opposite sides of and at an angle of 45° with respect to the kerf 2 and which converge toward the rear side of the bottom. The back of the box is formed of a pair of members 4 which are hinged to the bottom as at 5 so that they may be folded on the upper side of the bottom, as shown in Fig. 2, or may be arranged vertically, for use as shown in Fig. 1. To secure the members of the back when in raised position I provide each of said members, on its rear or outer side, with a pivoted hook 6 and I also provide the bottom with headed studs 7 on its rear side for engagement by the hooks. When the members 4 are in raised position an opening 8 is formed between them for the operation of the saw.

Supporting feet 9 are hinged as at 10 under the ends of the bottom so that they may be folded under the bottom or turned down therefrom to vertical position. Hooks 11 are provided to secure the feet in vertical position, said hooks being pivoted as at 12 on the ends of the bottom and the feet being provided on their outer sides with headed studs 13 for engagement by the hooks.

The central portion of the bottom is substantially semi-circular as at 14 and below said portion of the bottom is an arcuate supporting and guide bar 15 which is secured to the bottom by bolts 16, said bolts also passing through spacer blocks 17 which are interposed between the bottom and the said arcuate supporting bar. Spring buttons 18 are pivotally mounted on said bolts, between the bar 15 and the spacer blocks and are employed to engage and hold the feet 9 when the latter are folded under the bottom, one of the feet being shown so folded and secured in Fig. 4.

I also provide a foldable and longitudinally adjustable arm 19 which carries the saw guides. This arm comprises a pair of members 20—21. The member 20 is pivotally mounted under the center of the bottom, at the rear side of the bottom, by a bolt 22, a spacer block 23 being interposed between the bottom and said member. The said member 20 bears on and is adapted to be turned as desired on the arcuate bar 15 and is provided in its under side with a recess 24 for the reception of said bar, as shown in Fig. 4. The member 21 is arranged on the member 20 for longitudinal sliding movement, is provided with a slot 25 and is also provided on its under side at its sides, with flanges 26 which bear against opposite sides of the member 20. An adjusting bolt 27 connects the members 20 and 21 and operates in the slot 25, said adjusting bolt permitting the arm 19 to be adjusted longitudinally as desired. To secure the arm 19 at any desired adjustment, whether at a right angle or any other angle with respect to the box I provide the member 20 with a pivotally mounted dog 28 which may be engaged with any one of a series of radial lock notches 29 with which the bar 15 is provided. A soring 30 is provided to normally hold the dog in engaged position.

The member 20 is provided at its rear end with a folding section 30 and the member 21 is provided at its front end with a folding member 31. Said sections may be secured by hinges 32 or by any suitable pivoting devices. The opposing ends of said members and folding sections are beveled as at 33—34 so that said sections when turned down will be arranged horizontally and in line with said members. The section 31 has a longitudinal groove 35 in one side and the member 21 is provided on the corresponding side with a pivotally mounted bolt 36, the pivot of which is indicated at 37 and which bolt, when the section 31 is arranged horizontally, for use, may be swung into the groove 35 as shown in Fig. 1, so that, by tightening the nut 38 of said bolt the said section 31 will be securely locked in extended position.

A U-shaped guide 39 is secured on the upper side of the section 30, at the outer end of said section, by bolts 40 so that when said section is in horizontal extended position, the arms of said guides 39 will be vertical. A similar guide 41 is secured by bolts 42 on the upper side of the section 31, at the front end of said section. Vertically movable saw guide blocks 43 are arranged in the guides 39—41 and provided in their sides with vertical grooves 44 for the reception of the vertical arms of said guides the said blocks having kerfs 45, which are vertical, for the reception of the saw blade and being provided with transverse slots 46 at the upper ends of said kerfs, and with rollers 47 which are mounted and arranged in said transverse slots. The guide blocks are freely slidable vertically on the arms of the guides, and serve to guide the saw as will be understood. Each guide is provided near the lower end with a roller 48 made of some suitable soft or yielding material and to check the downward movement of the saw and prevent injury to the saw teeth.

When the sections 30—31 are folded as shown in dotted lines in Fig. 4 the saw guides are arranged transversely across the upper side of the bottom of the box, out of the way, thus enabling the box to be compactly folded.

While I have herein shown and described a preferred form of my invention, I would have it understood that changes may be made in the form, proportion and construction of the several parts without departing from the spirit of the invention and within the scope of the appended claim.

Having thus described my invention, I claim:—

A folding miter box of the class described comprising a bottom, a back comprising members hingedly connected to the bottom and foldable on the upper side thereof, supporting feet hingedly connected to the ends of the bottom and foldable under the same, an arm pivotally mounted under the bottom and comprising slidably connected members and sections pivotally mounted at the outer ends of said members, to fold longitudinally thereof, and saw guides on said sections.

In testimony whereof I affix my signature in presence of two witnesses.

JOHN F. GRABOWSKY.

Witnesses:
ROBT. M. KUMLIN,
H. A. STROEDE.

Copies of this patent may be obtained for five cents each, by addressing the "Commissioner of Patents, Washington, D. C."